United States Patent [19]

Li

[11] 3,853,833

[45] Dec. 10, 1974

[54] SYNTHETIC HUMAN GROWTH-PROMOTING AND LACTOGENIC HORMONES AND METHOD OF PRODUCING SAME

[75] Inventor: Choh Hao Li, Berkeley, Calif.

[73] Assignee: Hormone Research Foundation, Berkeley, Calif.

[22] Filed: July 15, 1971

[21] Appl. No.: 162,946

Related U.S. Application Data

[63] Continuation-in-part of Ser. No. 137,811, April 27, 1971.

[52] U.S. Cl............................. 260/112.5, 424/177
[51] Int. Cl..... C07c 103/52, C07g 7/00, C08h 1/00
[58] Field of Search................................ 260/112.5

[56] References Cited
OTHER PUBLICATIONS

Li et al., J. Am. Chem. Soc., 92, 7608(1970).
Bewley et al., Arch. Biochem. Biophys., 138, 338 (1970).
Li et al., Arch. Biochem. Biophys, 133, 70–73, 89–90 (1969).
Bewley et al., Biochim. Biophys. Acta, 154, 420 (1968).
Bewley et al., Arch. Biochem. Biophys., 144, 589 (1971).
Catt et al., Science, 157, 321 (1967).

*Primary Examiner*—Lewis Gotts
*Assistant Examiner*—Reginald J. Suyat
*Attorney, Agent, or Firm*—Pennie & Edmonds

[57] ABSTRACT

Synthetic human growth-promoting and lactogenic hormones, e.g., pituitary growth hormone (HGH) is produced by attaching phenylalanine, the COOH terminal amino acid of HGH, to a solid resin support, and then coupling stepwise to the supported acid the remaining amino acid residues of the hormone molecule, using the general technique of solid phase peptide synthesis with suitable protective and blocking groups, and deblocking and coupling agents. The resulting synthetic polypeptide chain of amino acid residues is liberated from the resin support and all protecting groups are removed. Then the synthetic hormone is oxidized under controlled conditions effective to form two disulfide bridges across the cysteine residues in the chain, thereby forming the two intramolecular rings which are required to reproduce the correct conformation of the HGH molecule. The resulting synthetic hormone reacts immunologically with rabbit antiserum to HGH and possesses growth-promoting and lactogenic activity.

30 Claims, 3 Drawing Figures

INVENTOR.
CHOH H. LI

SYNTHETIC HUMAN GROWTH-PROMOTING AND LACTOGENIC HORMONES AND METHOD OF PRODUCING SAME

CROSS-REFERENCE TO RELATED APPLICATION

This application is a continuation-in-part of a prior co-pending application Ser. No. 137,811, filed Apr. 27, 1971.

BACKGROUND OF THE INVENTION

1. Field of the Invention

This invention pertains to the field of human growth-promoting and lactogenic hormones, such as human pituitary growth hormone (HGH) and human chorionic somatomammotropin hormone (HCS). More particularly, the invention relates to the production of said hormones and certain of their derivatives by an entirely synthetic method, which achieves both the correct molecular conformations and the biological activities that have been exhibited by the natural hormones obtained from human pituitaries and placentas.

2. Description of the Prior Art

The isolation and structure of natural human pituitary growth hormone (HGH), as depicted in FIG. 1 of the drawings accompanying this application, have been published in the prior art (e.g., C.H. Li and H. Papkoff, Science, 124, 1293 (1956); C.H. Li, W.K. Liu and J.S. Dixon, Journal of the American Chemical Society, 88, 2050 (1966). The applicant has determined that the published formula of FIG. 1 does not correspond to the structure of natural human pituitary growth hormone but instead represents an entirely artificial product which has growth-promoting and lactogenic activities described in the earlier application identified in the cross-reference hereinabove. The correct formula of natural HGH is depicted in FIG. 2 of the drawings. It consists of a polypeptide chain of 190 amino acid residues in the sequence shown, with phenylalanine residues at its terminal COOH and NH$_2$ ends. There are two disulfide bridges linking the cysteine residues across positions 53 and 164 and across positions 181 and 188, thus forming two intra-molecular rings containing respectively one hundred ten and six amino acid residues (not counting the cysteine residues). The complexity of this molecule is self-evident.

Following the disclosure in the prior art of the growth-promoting and lactogenic potency of natural human HGH, there has been widespread interest in evaluating its clinical uses for alleviating human disorders such as dwarfism. However, such investigations have been frustrated by the lack of an adequate supply of the natural hormone. On the average only about 70 mg of natural HGH can be extracted from fifty fresh human pituitaries, and the availability of the requisite pituitaries from cadavers is quite limited. Thus, there has been a definite need in the prior art for a more ample source of HGH hormone which, to this applicant's knowledge, has not been satisfied heretofore.

It has been known also in the prior art that the human placenta contains a protein hormone, designated as human chorionic somatomammotropin (HCS), which possesses biological properties in common with those of HGH. However, the clinical evaluation of this material in humans has been hampered by problems of availability and adequate source of supply similar to those noted above in connection with HGH.

The present invention offers a solution to some of the foregoing problems by providing a synthetic method of producing HGH and HCS with the biological activities of the natural hormones, but without the difficulties of having to obtain them from their natural sources.

SUMMARY OF THE INVENTION

The invention is based upon several discoveries of fundamental importance which may be summarized as follows:

a. That the correct molecular conformation of HGH hormone can be achieved in a totally synthetic product with concomitant biological properties by use of a prescribed sequence of synthesis;

b. That the molecular conformation of HCS hormone is to a remarkable extent similar to that of HGH and that the same method of synthesis may be used to prepare synthetic, biologically-active HCS;

c. That approximately one-third of the HGH molecule separately has no growth promoting or lactogenic activity and is unnecessary to achieve such activity, and that the activity therefore is concentrated in the remaining two-thirds of the molecule;

d. That a synthetic material having only limited resemblance in its amino acid residue sequence to that of HGH and less than all the amino acid residues of HGH can be prepared by the same method of synthesis and that this material has growth-promoting and lactogenic activities; and e. That direct derivatives of the products referred to above in (a), (b) and (d) can be prepared without loss of biological activities.

The structures of the products referred to in (a), (b) and (d) above are illustrated in FIGS. 2, 3 and 1 respectively of the drawings. The method of synthesis which has been found to be useful for preparing all of these structures is summarized as: (1) formation of the requisite polypeptide chain of amino acid residues attached to a resin support using the general technique of solid phase peptide synthesis, (2) liberation of the polypeptide chain from the support and removal of all protective or blocking groups, thus generating sulfhydryl groups at the cysteine residues, (3) oxidation of the sulfhydryl groups under controlled conditions to form disulfide bridges across the cysteine residues and thus produce the two intra-molecular rings in the final molecules as depicted in the drawings.

While each of the foregoing general steps is essential in the sense that without it the synthetic hormones of the invention cannot be obtained, of critical importance is the oxidation step by which the disulfide bridges across the cysteine residues are formed. As indicated in FIGS. 2 and 3 of the drawings, the conformation of the HGH and the HCS molecule includes two intra-molecular rings containing respectively one hundred ten and six amino acid residues, while the conformation of the molecule shown in FIG. 3 includes two intra-molecular rings containing ninety-three and six amino acid residues. It has been discovered that these conformations can only be obtained by performing the oxidation step under carefully regulated conditions, after the polypeptide chain has been separated from the solid support. Experience has shown that while anchored to the support the polypeptide chain is under too great a constraint physically to undergo the bending and looping required to achieve the requisite ringed conformation, by oxidative linking of the cysteine sulfhydryl groups. On the other hand, once the polypeptide chain has been liberated from the impediment of the solid support, its oxidation must be carefully regulated in order to establish conditions under which the aforesaid bending and looping can occur to achieve the requisite conformations in synthetic, homogeneous, biologically active products.

Accordingly, because of its great importance to the successful practice of the invention, the conditions required during the oxidation step will now be described. First, it is necessary that the rate of oxidation be controlled by the presence of a separate reducing agent (i.e., oxidizable material) in admixture with the polypeptide. This reducing agent apparently retards or otherwise regulates the oxidation rate, and thus prevents degradation of the complex, delicate polypeptide and gives it an opportunity to assume the requisite conformation during the formation of the disulfide bridges. The reducing agent may be any organic mercapto compound signified by the formula, R-SH (where R is an organic hydrocarbon radical of 1 to 30 carbon atoms), which is inert to the HGH polypeptide. For best results, dithiothreitol is the preferred reducing agent and examples of other agents which can be used are mercaptoethanol and cysteine. The proportion of admixed reducing agent may vary from 10 mg to 200 mg per 100 mg of HGH polypeptide; however, the preferred proportion is 50 mg/100 mg. polypeptide.

The oxidation step is performed with the polypeptide in solution or suspension and the concentration of the polypeptide therein also must be controlled. This again appears to be an influencing factor on the rate and progress of oxidation in context of achieving the requisite ringed conformation, as concentrations beyond the operable range are not effective. Generally, the polypeptide concentration may be from about 0.01 mg to about 0.5 mg of polypeptide per ml of solution; however, for best results the preferred concentration is 0.25 mg per ml of solution.

The pH of the solution during oxidation is another factor which must be controlled in order to achieve the biologically active, synthetic products of the invention. The pH generally should be maintained within the range from about 4.5 to about 9.0; however, for best results the preferred pH is from 8.0 to 8.4.

Finally, the temperature to which the polypeptide solution is exposed during oxidation must be controlled. As previously mentioned, the synthetic polypeptide is a complex and delicate molecule which is susceptible to degradation or damage if the temperature exceeds certain limits during oxidation. Therefore, the ambient temperature surrounding the solution should be maintained in the range from about 0° to about 25° C. during oxidation.

The oxidation reaction carried out under the above-described conditions is an auto-oxidation, that is, it will proceed on exposure of the polypeptide solution to air, and this is the preferred method. However, air, oxygen or oxygen-inert gas mixtures can also be bubbled through the solution as an alternative. The oxidation is continued until the sulfhydryl groups on the cysteine residues have been oxidized to disulfide linkages. Generally, this will require at the minimum from four to 2 hours, or longer. There is no maximum limit to the duration of the oxidation time period beyond consumption of the sulfhydryl groups. Under the established controlled conditions, there is little likelihood of degradation or damage to the synthetic product if the oxidation is continued beyond that limit.

After completion of the oxidation step, the resulting synthetic hormone is treated with acetic acid for purposes of isolation and purification. The use of acetic acid for this purpose is important to prevent aggregation of the hormone and to retain its biological potency. The strength of the acetic acid may vary from a 10% to 75% aqueous solution; however, for best results the use of 50% aqueous acetic acid solution is preferred. The general technique which is preferred for separation and purification of the synthetic hormone is column or gel chromatography on polycarboxylic resins or dextran gels.

Figure 1:
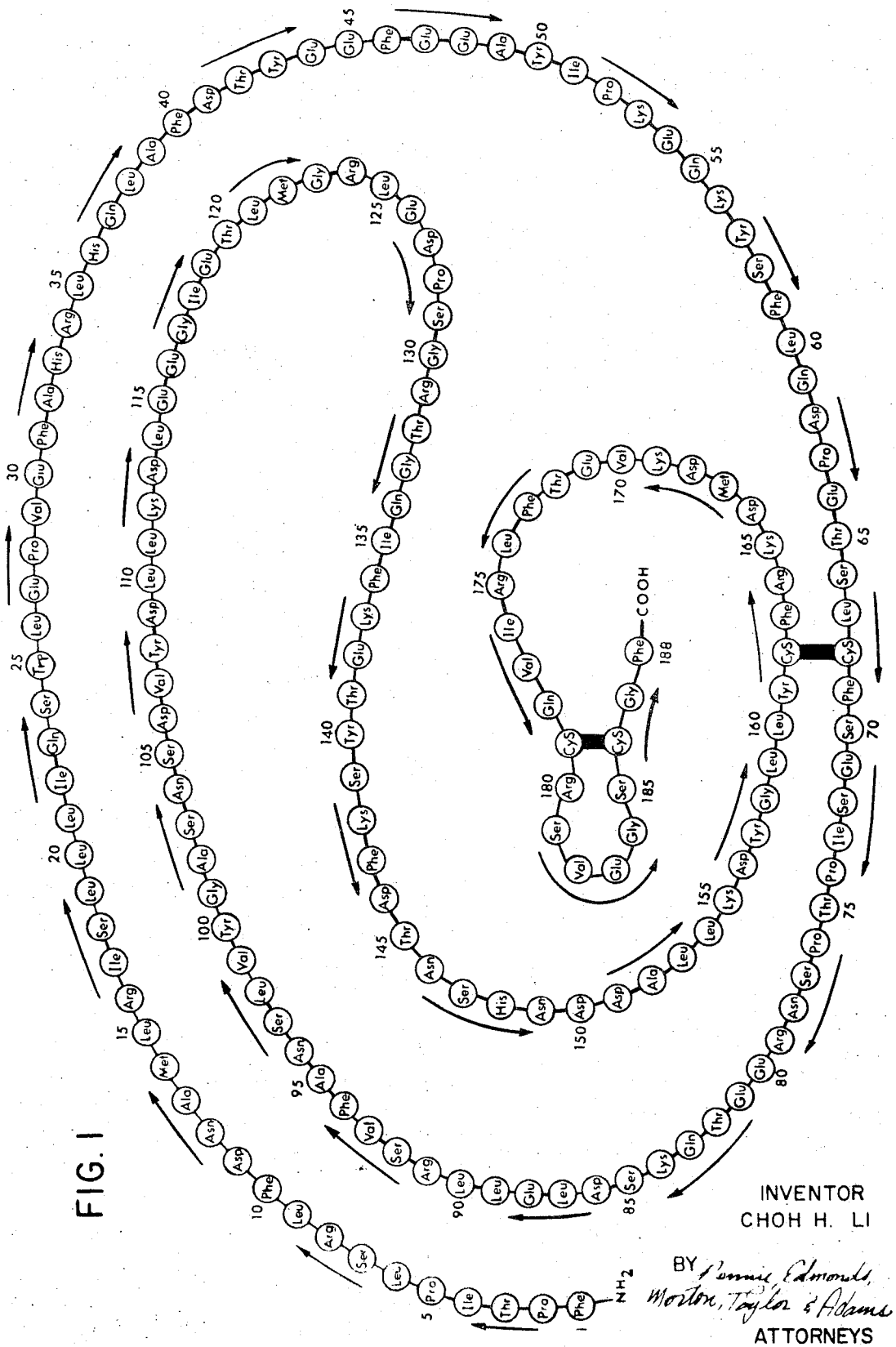
FIG. 1 depicts the molecular conformation and structure of a product related to human pituitary growth hormone.

In the drawings the numbers and arrows outside the acid residue units are merely aids for locating or studying portions of the total structure. The abbreviations for the various amino acid residues are standard and, for convenience, are tabulated below:

| Abbreviation | Amino Acid |
| --- | --- |
| Ala | Alanine |
| Arg | Arginine |
| Asn | Asparagine |
| Asp | Aspartic acid |
| Cys | Cystine (half) |
| Glu | Glutamic acid |
| Gln | Glutamine |
| Gly | Glycine |
| His | Histidine |
| Ile | Isoleucine |
| Leu | Luecine |
| Lys | Lysine |
| Met | Methionine |
| Phe | Phenylalanine |
| Pro | Proline |
| Ser | Serine |
| Thr | Threonine |
| Trp | Tryptophan |
| Tyr | Tyrosine |
| Val | Valine |

DESCRIPTION OF THE PREFERRED EMBODIMENTS

The molecular structure illustrated in FIG. 1 was thought heretofore in the art to correspond to that of natural HGH, but as indicated earlier hereinabove, applicant has discovered that this is not correct. The correct structure of HGH has been determined by applicant and is illustrated in FIG. 2. It consists of a polypeptide chain of 190 amino acid residues, as compared to the 188 amino acid residues in the polypeptide chain shown in FIG. 1. The 190 unit chain in the FIG. 2 structure is looped via disulfide bonds linking the cysteine residues across positions 53 and 164 and across positions 181 and 188 in to two intra-molecular rings containing respectively one hundred ten and six amino acid residues. In the FIG. 1 structure, the disulfide bonds link across positions 68 and 162 and across positions 179 and 186, and the resulting intra-molecular rings contain respectively 93 and six amino acid residues. In both structures the sequence of the first 16 amino acid residues counting from the terminal amino end is identical.

Figure 2:
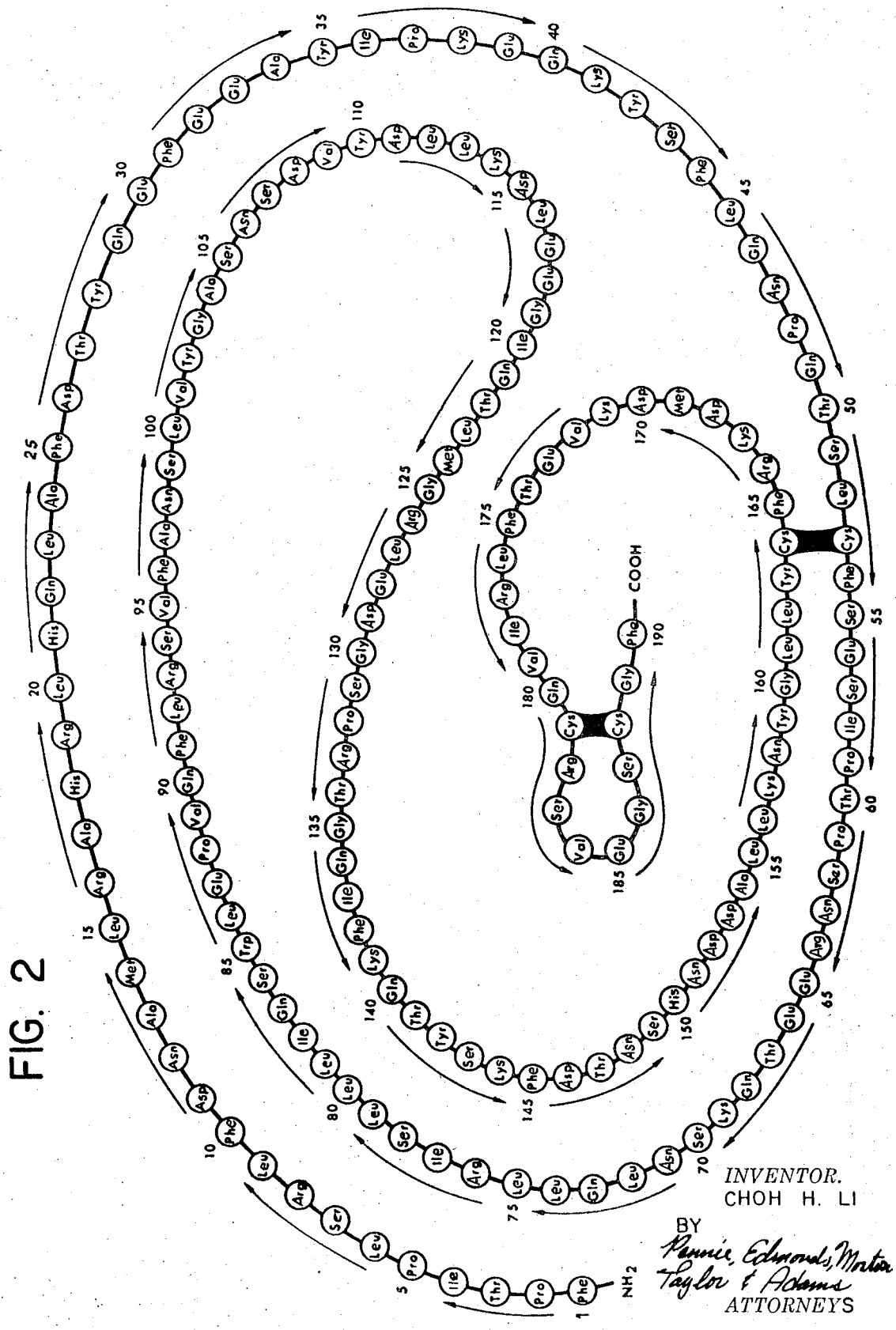
FIG. 2 depicts the molecular conformation and structure of human pituitary growth hormone (HGH)

Thus, while there is general similarity between the overall conformations and structures illustrated in FIGS. 1 and 2, there are differences in the number and sequence of amino acid residues and in the size of the larger of the two intramolecular rings present in both structures. Despite these differences, the structure illustrated in FIG. 1 has been synthesized, tested and found to have both growth-promoting and lactogenic activity, as was disclosed in the prior co-pending application. The recent findings that the structure of FIG. 1 is not a replica of the structure of HGH (FIG. 2) therefore establish that the precise structure of HGH is not necessary in a synthetic product to obtain the biological activities of the natural hormone.

Findings of a similar nature have been made by the applicant with respect to the correct structure of HGH shown in FIG. 2. Specifically, the portion of this molecule from position 1 up to and including position 85 separately has no growth-promoting or lactogenic activity. Hence these activities are chiefly manifestations of the remaining portion of the molecule from positions 86 to 190, and it is not necessary to include the inactive portion in a synthetic product having growth-promoting or lactogenic utility. Interestingly enough, however, a synthetic product lacking the inactive portion of the total molecule will possess less than the full potency of natural HGH with regard to growth-promoting and lactogenic activity, but the potency gradually will increase as the structure of the inactive portion is progressively added in increments to the active portion.

Present knowledge does not permit explaining why such addition of separately inactive elements of structure enhances the potency of the active portion, but the existence of this effect has been observed. Therefore, a synthetic product corresponding to that portion of the structure of FIG. 2 encompassed from position 86 to position 190, with respective terminal $NH_2$ and COOH groups at said positions, can be prepared by the method previously described herein to achieve potent biologically active material having up to about 50% of the growth-promoting or lactogenic activity of natural HGH. The potency of the product can be increased by lengthening the polypeptide chain by any portion of the inactive portion encompassed from positions 1 to 85 in FIG. 2, the magnitude of this increase in potency generally being in direct variation with the chain-length of added inactive portion. Accordingly, such progressively larger molecules, ranging on up to the total structure shown in FIG. 2, are all useful synthetic products for growth-promoting and lactogenic activity.

Figure 3:
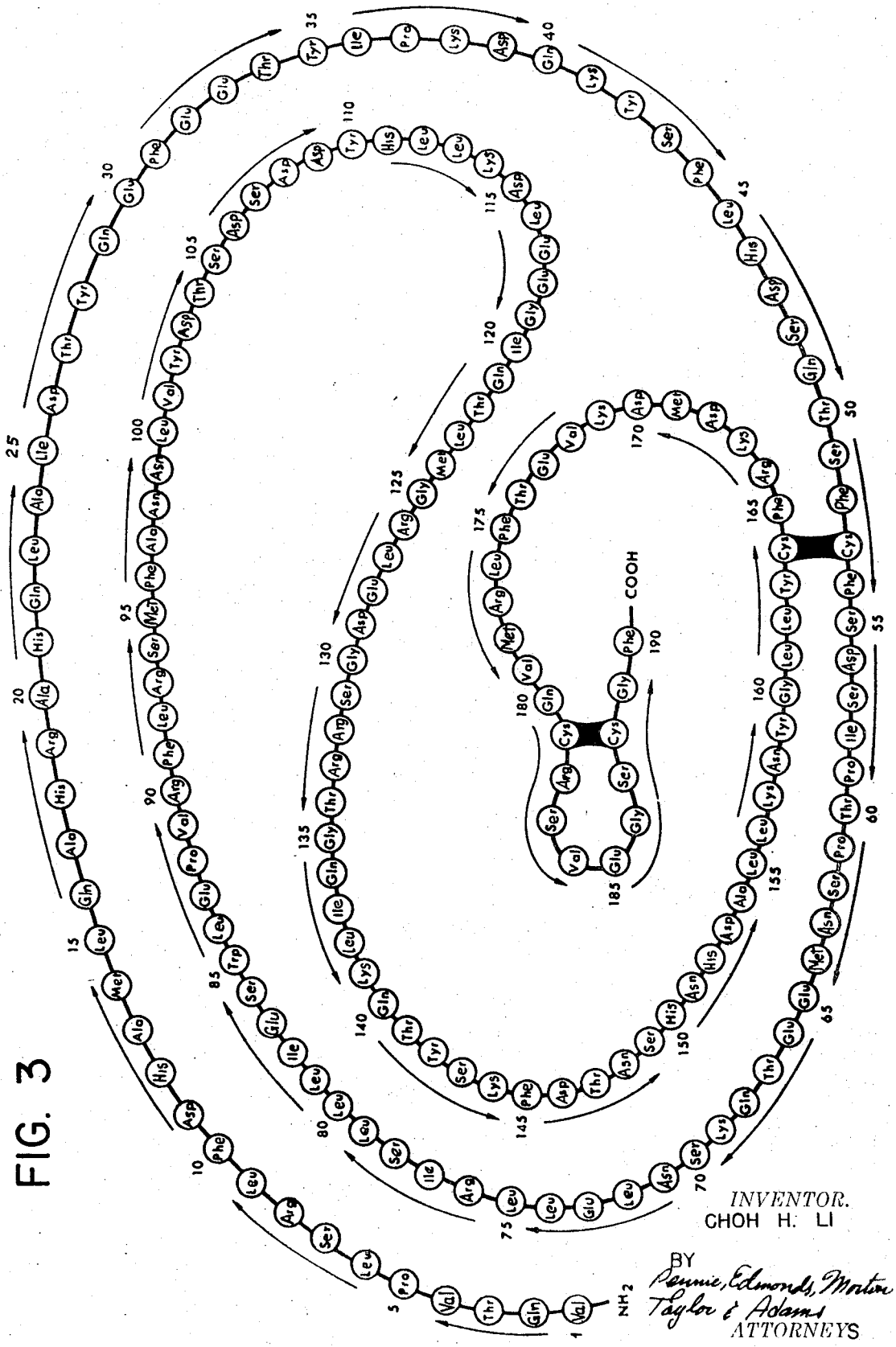
FIG. 3 depicts the molecular conformation and structure of human chorionic somatomammotropin hormone (HCS).

FIG. 3 depicts the molecular conformation and structure of natural HCS as recently determined by the applicant. It is remarkably similar to that of HGH (FIG. 2). The total number of amino acid residues in both molecules is identical, viz. 190. The disulfide bonds in both molecules link cysteine residues in the same positions, 53 to 164 and 181 to 188, forming two intramolecular rings in each molecule, which contain the identical number of amino acid residues in both. Of the total 190 amino acid residues in each molecule, 160 are identically positioned in both. The only differences in the amino acid residues and their positions are shown in the following table:

| Residue Position | HGH (FIG. 2) | HCS (FIG. 3) |
|---|---|---|
| 1–2 | Phe-Pro | Val-Gln |
| 4 | Ile | Val |
| 12 | Asn | His |
| 16 | Arg | Gln |
| 20 | Leu | Ala |
| 25 | Phe | Ile |
| 34 | Ala | Thr |
| 39 | Glu | Asp |
| 46–49 | Gln-Asn-Pro-Gln | His-Asp-Ser-Glu |
| 52 | Leu | Phe |
| 56 | Glu | Asp |
| 64 | Arg | Met |
| 73 | Gln | Glu |
| 83 | Gln | Glu |
| 90 | Gln | Arg |
| 95 | Val | Met |
| 99 | Ser | Asn |
| 103–104 | Gly-Ala | Asp-Thr |
| 106 | Asn | Asp |
| 109 | Val | Asp |
| 111 | Asp | His |
| 132 | Pro | Arg |
| 138 | Phe | Leu |
| 152 | Asp | His |
| 178 | Ile | Met |

The method of synthesis previously described in connection with preparation of products corresponding to FIG. 1 and 2 may also be used to prepare synthetic HCS hormone having the conformation and structure depicted in FIG. 3. Again, the oxidation step to form the disulfide bonds in synthetic HCS is vitally important and must be performed under the controlled conditions in order to achieve a synthetic product having useful growth-promoting and lactogenic activity.

In addition to the synthetic hormones depicted in the drawings, included within the scope of this invention are certain biologically derivatives thereof. These derivatives include substitution at the tryptophan residue (position 25 in FIG. 1 and 85 in FIGS. 2 and 3) with either a 2-hydroxy-5-nitrobenzyl group or a 2-nitrophenylsulfenyl group, which derivatives have growth-promoting activity. Another derivative is prepared by reduction of the cysteine residues (positions 68, 162, 179 and 186 in FIG. 1 and 53, 166, 181 and 186 in FIGS. 2 and 3) to sulfhydryl groups and alkylation with iodoacetamide to form a tetra-S-carbamidomethyl derivative which has growth-promoting and lactogenic activties. Finally, nitration of six of the eight tyrosine residues (positions 43, 50, 57, 100, 108, 140, 157 and 161 in FIG. 1 and 28, 35, 42, 102, 110, 142, 159 and 163 in FIGS. 2 and 3) yields hexa-nitrated derivatives which have growth-promoting and lactogenic activity. However, nitration of all eight tyrosine residues results in a complete loss of both growth-promoting and lactogenic activity.

As previously indicated, the initial phase of the method of this invention involves anchoring phenylalanine to a solid resin support and then coupling stepwise to the supported acid the remaining amino acid residues of the hormone molecules, using the general technique of solid phase peptide synthesis. This technique is comprehensively described, for example, by J.M. Stewart and J.D. Young in "Solid Phase Peptide Synthesis" (W.H. Freeman and Company, San Francisco, 1969). The basic sequence involves reacting a protected amino acid, i.e., t-butyloxycarbonyl phenylalanine, with a synthetic resin such as chloromethylated styrene-divinylbenzene copolymer to form an ester bond between the carboxyl groups of the protected acid and the reactive halogenated sites of the resin. The protective group is then selectively removed to generate the free amino group of the resin-supported phenylalanine residue, thus making this group available for reaction with the carboxyl group of the next protected amino acid, glycine. This next reaction links the protected amino acid and the resin-supported acid residue by an amide bond, and subsequent removal of the protective group from the second acid residue to generate a free amino group again prepares the supported peptide chain for reaction with the next protected amino acid, etc. After the entire polypeptide chain has been developed by stepwise coupling of each amino acid residue as described above, the chain is separated from the resin support and the protective groups on the polypeptide side chains are removed by reaction with cleaving and deblocking agents, e.g., hydrogen fluoride and sodium in liquid ammonia, thus generating the free polypeptide.

The various protective, coupling, deblocking and cleaving agents which are useful in the technique of solid phase synthesis with the species of amino acids that are included in the molecules depicted in the drawings are described in the art. Generally speaking, these agents also may be used in forming the polypeptide chains of 188 and 190 amino acid residues shown in the drawings, and the various specific alternatives which may be practiced will be evident to those skilled in the art from the subsequent description of the preferred embodiments of the method of the invention.

In order to further illustrate the principles of the invention and to indicate the best modes presently contemplated of practicing it, the following specific embodiments are now described.

Example 1

Synthesis of the 188 amino acid polypeptide chain of the structure shown in FIG. 1 was initiated by esterification of 0.52 mmol of tert-butyloxycarbonyl-protected phenylalanine to 2.5 g of chloromethylated 1% cross-linked polystyrenedivinylbenzene resin (available commercially from Bio-Rad Laboratories, Richmond, California). The tert-butyloxycarbonyl protective group (i.e., Boc) was subsequently removed by reaction of the protected phenylalanine-resin ester for 15 minutes with 50% (v/v) trifluoroacetic acid in methylene chlordie. Thereafter, Boc-protected glycine was coupled to the resin-supported phenylalanine residue using dicyclohexylcarbodiimide as the coupling agent, the reaction being carried out over 5 hours with 4 equivalent of the protected glycine and of the coupling agent per equivalent of the phenylalanine residue attached to the resin support.

After removal to the Boc protective group from the glycine residue with the same trifluoroacetic acid deblocking agent, the resulting free amino group was ready for coupling to the next protected amino acid, cysteine.

The stepwise coupling of the successive amino acid residues in the sequence of the HGH molecule was continued using the technique disclosed above. The Boc group was used for protection of the α-amino group of all amino acids. Certain of the amino acids were used in the form derivatives, and the Boc protective group was used to protect the α-amino group of these derivatives as well. Such derivatives were the β-benzyl ester of aspartic acid, the β-benzyl ether of threonine, the β-benzyl ether of serine, the γ-benzyl ester of glutamic acid, the β-benzyl thio ether of cysteine, the benzyl ether of tyrosine, ε-carbobenzoxy substituted lysine and $N^G$-nitro substituted arginine. For introduction of the histidine residue $N^\alpha$-Boc (im-Boc)-L-histidine was used.

The coupling reactions were carried out with dicyclohexylcarbodiimide in the manner described above, except that the asparagine and glutamine acids were coupled by means of their nitrophenyl esters. Also, for the coupling of the valine, isoleucine and nitroarginine residues, six equivalents of the protected acid and of the coupling agent were used per equivalent of phenylalanine residue originally attached to the supporting resin.

The nitrophenyl esters of asparagine and glutamine were coupled by reaction of 10 equivalents of the ester per equivalent of phenylalanine residue for 5 hours, followed by and additional 5-hour reaction in the presence of five equivalents of imidazole.

After the tryptophan residue was incorporated in position 25, 0.08 mole of dithiothreitol was added to the trifluoroacetic acid deblocking agent and this combination was used in all subsequent removals of the Boc protective group in order to deblock and preserve the tryptophan residue.

The foregoing procedures yielded a protected, unbridged 188 acid residue, synthetic polypeptide in the sequence shown in FIG. 1 of the drawings, with the COOH terminal phenylalanine residue attached to the supporting resin. In order to remove all protecting groups from the synthetic polypeptide and to liberate it from the supporting resin, it was reacted with hydrogen fluoride and then with sodium in liquid ammonia. The liberated synthetic polypeptide was next treated with liquid hydrogen fluoride in the presence of anisole for 15 minutes at 0°C. and approximately 15 minutes at 0°–20° C. The polypeptide next was purified in 50% acetic acid and then it was treated in four batches with sodium in liquid ammonia. The total amount of polypeptide was 330 mg, and each batch (ca. 80 mg) was stirred near the boiling point for 2 hours in 350 ml of liquid ammonia freshly distilled from sodium, and then treated at the boiling point with sodium until a light blue color was maintained for about 1 hour.

The foregoing treatments resulted in removal of all blocking groups and generation of sulfhydryl groups at the cysteine residues in the liberated polypeptide chain. Next the deblocked, purified synthetic polypeptide was auto-oxidized in air under the following controlled conditions, as indicated previously to be of critical importance. The concentration of the polypeptide was about 0.25 mg/ml of solution. Included in the solution was about 0.5 mg of dithiothreitol per mg of the polypeptide. The pH was maintained at 8.4, and oxidation was carried out for 4–5 hours at 25°C. This step resulted in the formation of disulfide linkages between the cysteine residues across positions 68 and 162 and across positions 179 and 186, to form the two intramolecular rings illustrated in FIG. 1.

The oxidized polypeptide was isolated by lyophilization and desalted on dextran gel (available commercially as Sephadex G-25 from Pharmacia Labs Inc., Piscataway, New Jersey) in 50% acetic acid. It was then subjected to repeated gel filtration on dextran gel (Sephadex G-100) in 20% acetic acid until a fraction was isolated which travelled in the column as a single peak at a maximum comparable to the curve of natural HGH hormone.

Spectrophotometric measurements on the synthetic protein indicated a tyrosine:tryptophan ratio of 7.5 as compared to the known value of 8. Amino acid analysis of an acid hydrolysate gave: $Lys_{12.8}His_{1.8}Arg_{9.7}Asp_{25.5}Thr_{9.2}Ser_{17.8}Glu_{22.0}Pro_{5.9}Gly_{9.9}Ala_{7.8}Cys_{4.3}Val_{9.2}Met_{1.5}Ile_{7.2}Leu_{30.1}Tyr_{3.6}Phe_{12.4}$. These values were comparable with the analysis of natural HGH treated with HF and Na-NH$_3$: $Lys9.9His_{2.5}Arg_{10.0}Asp_{23.3}Thr_{9.9}Ser_{17.1}Glu_{28.7}Pro_{8.1}Gly_{9.3}Ala_{7.1}Cys_{3.1}Val_{7.6}Met_{1.2}Ile_{6.7}Leu_{24.7}Tyr_{6.4}Phe_{11.9}$.

The synthetic product was found to react immunologically with the rabbit antiserum to HGH as revealed by the agar diffusion test. When the synthetic product was assayed by the rat tibia and pigeon crop-sac tests, it gave approximately 10% growth-promoting potency and 5% lactogenic activity in comparison with that of natural HGH hormone.

Example 2

The synthetic polypeptide obtained as described in Example 1 may be reacted with 2-hydroxy-5-nitrobenzyl bromide to form a biologically active derivative at the tryptophan residue in the molecule. In order to form the derivative, 10 mg of 2-hydroxy-5-nitrobenzyl bromide is added to 1.0 ml of a 2% solution of the synthetic polypeptide in 0.1M acetic acid. The mixture is stirred at room temperature for one hour, and then diluted and thoroughly dialyzed against distilled water for two days. After lyophilization, the product is dissolved in 0.01M ammonium hydroxide and chromatographed on a column of dextran using 0.1M ammonium hydroxide as eluent to remove any unreactive reagent. The unretarded fraction is recovered by lyophilization.

Example 3

The synthetic polypeptide obtained as described in Example 1 may be reduced and alkylated with iodoacetamide to form another biologically derivative. In order to form this derivative, the disulfide bridges in the polypeptide are first reduced with mercaptoethanol in 8M urea. The polypeptide is dissolved in the 8M urea solution in a concentration of 20 mg of polypeptide per ml of solution, and the pH of the solution is adjusted to 8.5 with 5% methylamine solution. Air is removed by flushing with nitrogen and, after addition of 0.01 ml of mercaptoethanol per mg of polypeptide, reaction is allowed to proceed in a stoppered flask for 6 hours at 23° C. Water is added to dilute the urea concentration to 2M and then a tenfold excess (with respect to mercaptoethanol) of iodoacetamide is added with adjustment of the pH to 8.5 by addition of 5% methylamine solution. The solution is allowed to stand for 15 minutes and at the end of this period the unreacted iodoacetamide in the mixture is removed by reaction with an excess of mercaptoethanol. The reaction product is purified by exclusion chromotography on dextran using 0.01M ammonium hydroxide solution as the eluent. The resulting final product comprises a tetra-S-carbamidomethyl derivative of the synthetic polypeptide which has the biological activity of the parent synthetic hormone.

Example 4

The synthetic polypeptide obtained as described in Example 1 may be reacted with 2 nitrophenylsulfenyl chloride to form another biologically active derivative at the tryptophan residue in the molecule. In order to form this derivative, 1 $\mu$mole of the synthetic polypeptide is dissolved in 2 ml of 25% acetic acid and 20 $\mu$moles of 2-nitrophenylsulfenyl chloride (dissolved in 1 ml of glacial acetic acid) are added with stirring. After 1 hour the reaction product is separated from the unreacted excess of 2-nitrophenylsulfenyl chloride by gel filtration on a 2.2 × 20 cm column of dextran gel (Sephadex G–25), which has been preequilibrated and eluted with 0.2M acetic acid. After lyophilization (or concentration by ultrafiltration), final purification of the reaction product is carried out by gel filtration using a 3 × 60 cm column of dextran gel (Sephadex–100), which also has been preequilibrated and eluted with 0.2M acetic acid solution. The final, purified derivative is recovered by lyophilization or ultrafiltration.

Example 5

The synthetic polypeptide obtained as described in Example 1 may be reacted with tetranitromethane to form a hexa-nitro, biologically active derivative at the tyrosine residues. In forming this derivative, the polypeptide is dissolved in Tris buffer (pH 8.0, 0.05M) at a concentration of 10 mg per ml, and a 0.85 molar solution of tetranitromethane in 95% ethanol is added in a molar ratio of polypeptide:tetranitromethane of 1:54. The reaction is carried out at room temperature for 60 minutes in a closed vessel and then the reaction mixture is submitted to gel filtration on dextran gel (Sephadex G–25) equilibrated with 0.01M NH$_4$CO$_3$ at pH 8.4. The nitrated polypeptide is concentrated by ultrafiltration, re-chromatographed on dextran gel (Sephadex G–100) and lyophilized.

The foregoing procedure results in a derivative in which six of the eight tyrosine residues in the polypeptide are nitrated, with retention of growth-promoting and lactogenic activity. It has been determined that these six residues are distinguished from the remaining two in that the former may be readily nitrated by the described procedure but not so in the case of the latter. The remaining two tyrosine residues can be nitrated only in the presence of 5M guanidine hydrochloride and thus may be less accessible or otherwise non-reactive to the nitrating reagent in the absence of guanidine hydrochloride. The point is that nitration with tetranitromethane alone produces nitro substitution on only the same six tyrosine residues through which specific ones they may be is not presently known; however, the completely nitrated derivative obtainable only by use of guanidine hydrochloride is devoid of growth-promoting or lactogenic activity.

The detailed procedures described hereinabove in connection with preparation of a synthetic hormone corresponding to FIG. 1 of the drawings and derivatives thereof are useful in the same way for preparing synthetic, biologically active HGH and HCS hormones corresponding to the structures shown in FIGS. 2 and 3, as well as the corresponding derivatives thereof. With all three primary structures, the criticality of the conditions required during oxidation to form the cysteine-bridging disulfide bonds to achieve the required ringed conformations is of the same paramount importance.

The biological potency and activity of the synthetic polypeptides produced in accordance with the invention were determined by standard tests utilized in the art for evaluating such properties. Thus the immunological reaction with rabbit antiserum to HGH was determined by the agar diffusion test described by O. Ouchterlony, "Acta Pathol. Microbiol. Scand.," 26, 507 (1949); 32, 231 (1953). The growth-promoting activity of the synthetic polypeptide was evaluated by the rat tibia test described by I.I. Geschwind and C.H. Li in "The Hypophyseal Growth Hormone, Nature and Actions," R.W. Smith, Jr., O.H. Gaebler, and C.N.H. Long, Ed., Blakiston, New York, N.Y., 1955, p. 28. The lactogenic activity of the synthetic polypeptide was assayed by the pigeon crop-sac test described by W.R. Lyons, "Proc. Soc. Exptl. Biol.," 35, 645 (1937); C.S. Nicoll, "Endocrinology," 80, 641 (1967).

The growth-promoting and lactogenic activities of the synthetic hormone produced in accordance with Example 1 were compared to the activites of natural HGH hormone and of natural HGH hormone reduced and oxidized by the same treatments with sodium in liquid ammonia and air in the presence of dithiothreitol as used in said example to produce the synthetic material. The results of these comparisons are given in the following table:

|  | Rat Tibia Test | | Pigeon Local Crop Test | |
| --- | --- | --- | --- | --- |
| Preparation | Total Dose μg | Tibia Width μ | Total Dose μg | Dry Mucosal Weight* mg |
| Natural HGH | 20 | 211 ± 4(12) | 2 | 13.5 ± 3(6) |
|  | 60 | 269 ± 5(11) | 8 | 18.2 ± 5(5) |
| Natural HGH-Reduced and Oxidized | 50 | 212 ± 26(4) | 5 | 12.2 ± 3(4) |
|  | 200 | 270 ± 17(4) | 40 | 20.2 ± 4(4) |
| Synthetic HGH | 50 | 184 ± 10(4) | 50 | 12.5 ± 3(4) |
|  | 200 | 223 ± 17(3) | 200 | 20.5 ± 3(3) |
| Saline | 0 | 168 ± 2(12) | 0 | 8.0 ± 2(6) |

* Mean ± standard error (no. of rats or pigeon crop sacs).

As established by the foregoing data, the invention provides synthetic HGH and HCS hormones which have the conformation of the natural hormones, and also the biological activities thereof. The synthetic products are useful for promotion of growth and lactation in animals and their clinical effectiveness for the same purposes in humans is clearly indicated by these data.

It should be understood that although particular embodiments of this invention have been described in detail by way of illustration, the invention includes all modifications and equivalents thereof within the scope of the appended claims.

I claim:

1. A method of producing synthetic human pituitary growth hormone which comprises:

a. forming an unbridged polypeptide chain of amino acid residues in the sequence of natural human pituitary growth hormone;

b. generating sulfhydryl groups on the cysteine residues in said polypeptide chain;

c. oxidizing said sulfhydryl groups under conditions effective to form disulfide bridges between said cysteine residues, thereby forming two intramolecular rings in the polypeptide chain.

2. A method of producing synthetic human chorionic somatomammotropin hormone which comprises:

a. forming an unbridged polypeptide chain of amino acid residues in the sequence of natural human chorionic somatomammotropin hormone;

b. generating sulfhydryl groups on the cysteine residues in said polypeptide chain;

c. oxidizing said sulfhydryl groups under conditions effective to form disulfide bridges between said cysteine residues, thereby forming two intramolecular rings in the polypeptide chain.

3. A method of producing a substance having growth-promoting activity which comprises:

a. forming an unbridged polypeptide chain of amino acid residues in a sequence corresponding to FIG. 2 or 3 of the accompanying drawing;

b. generating sulfhydryl groups on the cysteine residues in said polypeptide chain;

c. oxidizing said sulfhydryl groups under conditions effective to form disulfide bridges between said cysteine residues, thereby forming two intramolecular rings in the polypeptide chain.

4. A method according to claim 3 wherein said oxidation is carried out in solution in the presence of an organic mercapto compound of formula R—SH, wherein R represents an organic hydrocarbon radical of 1 to 30 carbon atoms, the proportion of said mercapto compound being from about 10 to about 200 mg per 100 mg of said polypeptide, the concentration of said polypeptide being from about 0.01 to about 0.5 mg of polypeptide per ml of solution, the pH of said solution being maintained from about 4.5 to about 9.0, and the ambient temperature being maintained from about 0° to about 25° C.

5. A method according to claim 4 wherein the proportion of said mercapto compound is about 50 mg per 100 mg of said polypeptide, the concentration of said polypeptide is about 0.25 mg of polypeptide per ml of solution, and the pH is maintained from about 8.0 to about 8.4.

6. A method according to claim 5 wherein said mercapto compound is dithiothreitol, mercaptoethanol or cysteine.

7. A method according to claim 3 which includes the further step, subsequent to said step (c), of reacting said poypeptide with 2-hydroxy-5-nitrobenzyl bromide to form a derivative having 2-hydroxy-5-nitrobenzyl substituted on the tryptophan residue of said polypeptide.

8. A method according to claim 3 which includes the further step, subsequent to said step (c), of reacting said polypeptide with 2-nitrophenylsulfenyl chloride to form a derivative having 2-nitrophenylsulfenyl substituted on the tryptophan residue of said polypeptide.

9. A method according to claim 3 which includes the further steps, subsequent to said step (c), of reducing said disulfide bridges to sulfhydryl groups on the cysteine residues of said polypeptide and reacting said reduced polypeptide with iodoacetamide to form a derivative having tetra-S-carbamidomethyl substituted on said cysteine residues.

10. A method according to claim 3 which includes the further step, subsequent to said step (c), of reacting said polypeptide with tetranitromethane to form a derivative having nitro groups substituted on those six of the eight tyrosine residues of said polypeptide which are nitratable in the absence of guanindine hydrochloride.

11. A method of producing a substance having growth-promoting activity which comprises:
   a. forming an unbridged polypeptide chain of amino acid residues in a sequence corresponding to (i) the portion of the sequence of FIG. 2 of the drawing from positions 86 to 190 or (ii) the said portion (i) combined with any fraction of the remaining portion from position 85 to position 1;
   b. generating sulfhydryl groups on the cysteine residues in said polypeptide chain;
   c. oxidizing said sulfhydryl groups under conditions effective to form a disulfide bridge between said cysteine residues across positions 181 and 188; thereby forming an intra-molecular ring in the polypeptide chain.

12. A composition of matter consisting essentially of a synthetic, biologically active substance which has a structure corresponding to FIG. 2 of the accompanying drawing.

13. A composition according to claim 12 which is substituted with 2-hydroxy-5-nitrobenzyl group on the tryptophan residue thereof.

14. A composition according to claim 12 which is substituted with 2-nitrophenylsulfenyl on the tryptophan residue thereof.

15. A composition according to claim 12 without the disulfide bridges shown in the drawing and substituted instead with tetra-S-carbamidomethyl groups on the cysteine residues thereof.

16. A composition according to claim 12 which is substituted with nitro groups on those six of the eight tyrosine residues which are nitratable in the absence of guanidine hydrochloride.

17. A composition of matter consisting essentially of a synthetic, biologically active substance which has a structure corresponding to (a) the portion of the structure of FIG. 2 of the drawings from positions 86 to 190 or (b) the said portion (a) combined with any fraction of the remaining portion from position 85 to position 1.

18. A composition of matter produced in accordance with the method of claim 1.

19. A composition of matter produced in accordance with the method of claim 2.

20. A composition of matter produced in accordance with the method of claim 3.

21. A composition of matter produced in accordance with the method of claim 7.

22. A composition of matter produced in accordance with the method of claim 8.

23. A composition of matter produced in accordance with the method of claim 9.

24. A composition of matter produced in accordance with the method of claim 10.

25. A composition of matter produced in accordance with the method of claim 11.

26. A composition of matter consisting essentially of a synthetic, biologically active substance which has a structure corresponding to FIG. 3 of the accompanying drawing.

27. A composition according to claim 26 which is substituted with 2-hydroxy-5-nitrobenzyl group on the tryptophan residue thereof.

28. A composition according to claim 26 which is substituted with 2-nitrophenylsulfenyl on the tryptophan residue thereof.

29. A composition according to claim 26 without the disulfide bridges shown in the drawing and substituted instead with tetra-S-carbamidomethyl groups on the cysteine residues thereof.

30. A composition according to claim 26 which is substituted with nitro groups on those six of the eight tyrosine residues which are nitratable in the absence of guanidine hydrochloride.

* * * * *